United States Patent [19]

Travis

[11] 4,053,062
[45] Oct. 11, 1977

[54] TUBE BUNDLE EXTRACTOR FOR USE WITH HEAT EXCHANGERS

[76] Inventor: Bobby J. Travis, 345 Mayhaw St., Vidor, Tex. 77662

[21] Appl. No.: 617,076

[22] Filed: Sept. 26, 1975

[51] Int. Cl.$^2$ .............................................. B66F 1/00
[52] U.S. Cl. ..................... 214/1 P; 29/726; 214/16.4 R; 214/152; 254/93 R; 254/105
[58] Field of Search ............... 214/1 P, 1 R, 1.4, 152, 214/1 F, 1.5, 1.3; 254/105, 189, 135 R, 93 R; 29/202 R

[56] References Cited

U.S. PATENT DOCUMENTS

| | | | |
|---|---|---|---|
| 2,548,785 | 4/1951 | Harney | 214/1.4 |
| 2,595,522 | 5/1952 | Harney | 214/1.2 X |
| 3,048,280 | 8/1962 | Huff et al. | 214/1 P |
| 3,792,758 | 2/1974 | Wentz | 214/730 X |
| 3,836,015 | 9/1974 | Travis | 214/1 P |
| 3,935,811 | 2/1976 | Lenz | 214/1 F X |

Primary Examiner—Frank E. Werner
Attorney, Agent, or Firm—Roy H. Smith, Jr.

[57] ABSTRACT

The invention operates on a bundle of cooling tubes which in use are disposed within a heat exchanger shell which is typically a longitudinally elongated cylinder disposed with its long axis horizontal and supported well above a floor, on a steel framework. The array of tubes become corroded and clogged after a period of use, either internally, externally, or both, and must be pulled linearly out of the shell for replacement. Typically the initial pulling is a difficult job because the tubes have become tightly corroded to the shell.

Herein is disclosed an improvement to the type of tube bundle extractor in which the operative unit is a car movable along a pair of rails supported in alignment with the heat exchanger, the rails being supported on a framework which is usually suspended from a crane hook, the framework being secured to one end of the heat exchanger during a bundle pulling or bundle inserting step.

Whereas in the prior art the bundle of tubes was moved by a linear hydraulic actuator mounted on the movable car, the following specification teaches the use of similar actuators having their cylinders mounted on the framework of the extractor so that their extensible piston rods travel parallel to the path of the car. The actuators move the car through sheave and cable means, and preferably operate oppositely, i.e., when one actuator is pulling the car a paired actuator is following in the opposite direction preparatory to a subsequent pulling step.

9 Claims, 17 Drawing Figures

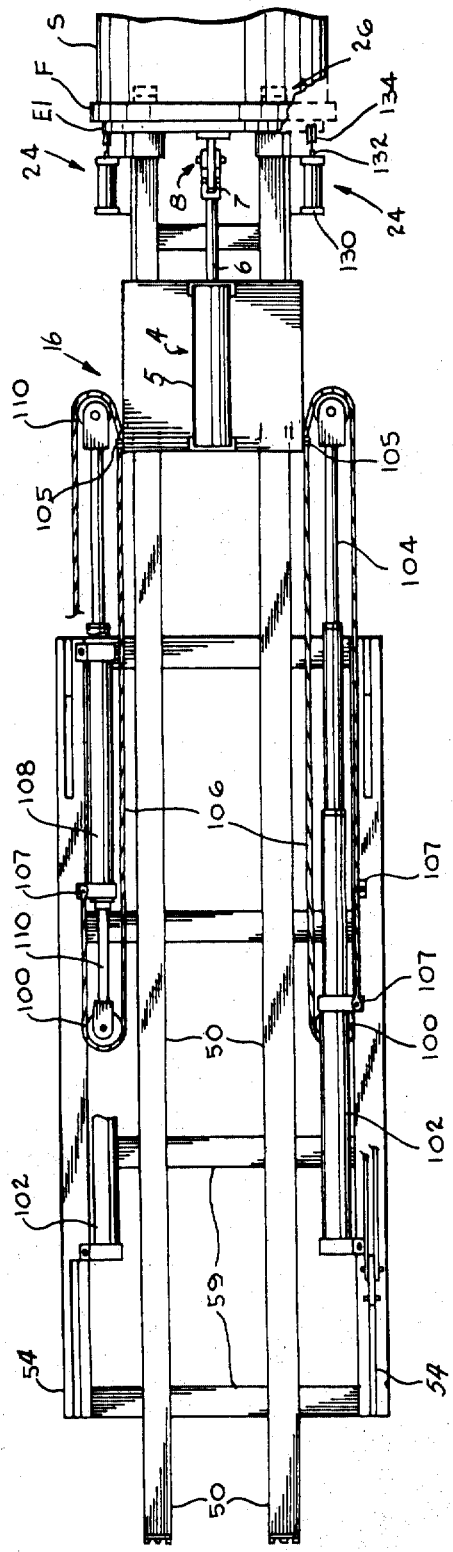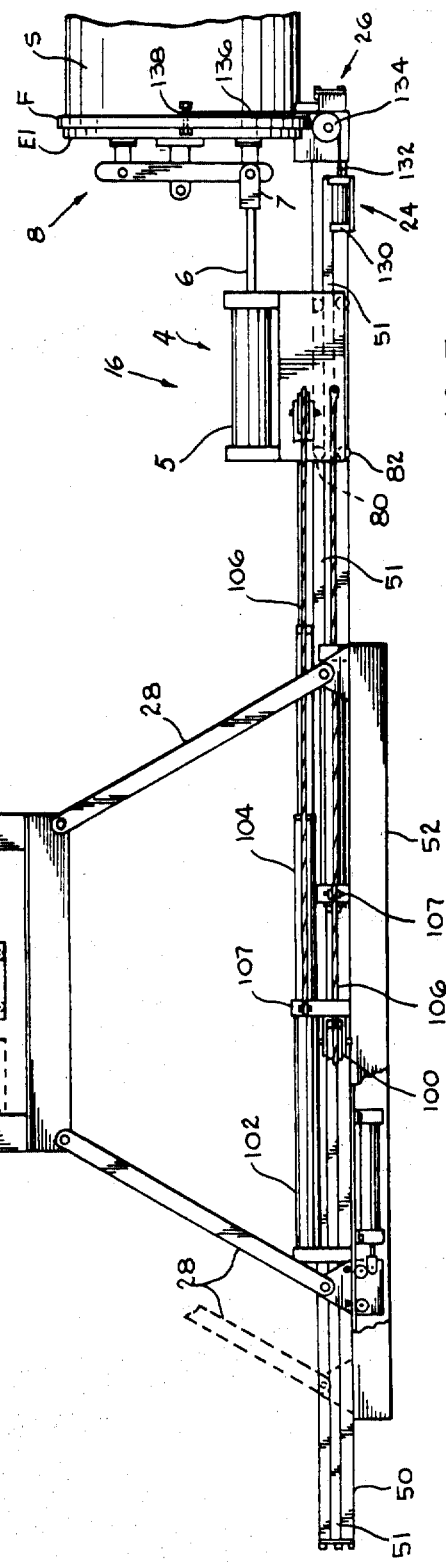

TUBE BUNDLE EXTRACTOR HEAT EXCHANGERS

FIELD OF THE INVENTION

The present invention lies broadly within the field of linear force application devices, i.e., devices to apply a force to one linearly elongated object to move it with respect to another, while at the same time retaining the second linearly elongated object in a static position. More specifically, the present invention constitutes an improved tube bundle extractor, one designed and adapted to pull an array of tubing from a horizontally elongated heat exchanger shell.

PRIOR ART

In the tube bundle extractor field, the most pertinent art disclosures are in the patents of the present inventor, U.S. Pat. No. 3,567,044, issued Mar. 2, 1971, and U.S. Pat. No. 3,836,015, issued Sept. 17, 1974. The earlier patent discloses a tube bundle extractor including a rail-supporting base frame and disposed in line with a horizontally mounted heat exchanger, a connector used for clamping one end of the base frame to the shell of the heat exchanger, a car disposed on the rails for movement in the longitudinal direction of the base frame, a large hydraulic cylinder secured to the movable car and having its piston extensible in the same longitudinal direction, means for connecting the free end of the piston to the end sheet of the tube bundle within the heat exchanger, and dog means depending from the car to contact cross beams of the base frame during a power stroke of the piston, to transmit reaction force to the frame. While such tube bundle extractor has worked admirably, the patent does not disclose any prime mover arrangements other than one located on the car itself, alternately bracing the car to the framework during power strokes which move the tube bundle and releasing the car from the framework when the car itself is to be moved preliminary to the next power stroke.

The later United States patent referred to above also utilizes the same main prime mover arrangement in which the car and tube bundle are moved alternately, and in addition discloses several auxiliary drives which may be used for moving the car and tube handle at the same time. These take the form of various types of chain drives, rack and pinion drives, etc. They are auxiliary in the sense that they are used when the main prime mover mounted on the car has first broken loose the bonds between the tube bundle and the heat exchanger shell, so that thereafter only a considerably reduced force is necessary to complete the withdrawal of the tube bundle. The application also discloses several subsidiary improvements which are also incorporated in the present disclosure, including means for connecting a pulling member which is offset from the center of a bundle of U-tubes to the end sheet of such bundle through a cluster of holes at the center of the end sheet; remotely controllable means for shifting one part of the framework with respect to the other to adjust the center of gravity of the combined framework and any tube bundle it may be supporting; novel and remotely controlled means for both aligning the extractor with the heat exchanger shell and securing abutting ends of the two structures together against vertical loads; novel means for clamping such two ends together to prevent longitudinal movement; and improved means for adjusting the width of the extractor to accommodate tube bundles of various diameters.

Other prior art disclosures teach assemblies somewhat similar to that of the Travis patents, but differ therefrom primarily in the means for supporting and propelling the movable car or carriage. In one such prior art disclosure, the carriage supports pendent from its lower portion a large nut which threadedly engages a worm gear or feed screw extending longitudinally between the rails on which the carriage travels. In other prior art extractors the carriage and tube bundle are suspended from a monorail as the carriage pulls the tubes from the heat exchanger. Yet other extractors make extensive use of chain drive systems, both for pulling the tube bundle loose from the heat exchanger and in moving the car and attached tube bundle to disengage the tube bundle from the heat exchanger.

None of these prior art devices discloses a prime mover utilizing simple linear hydraulic actuators as the prime mover for the load. For the most part, the means they do disclose for moving the tube bundle are complicated and cumbersome. Most of them also have the disadvantage of a low mechanical advantage, requiring a foot of travel of the moving mechanism for each foot of travel of the tube bundle.

OBJECTS OF THE INVENTION

It is the principal object of the present invention to provide a tube bundle extractor obviating the aforementioned disadvatages of the prior art. A more specific object is to provide a tube bundle extractor of the type in which a pair of rails support a movable car, but in which a dual set of prime movers is provided for the tough job of breaking loose the corroded tube bundle from the heat exchanger shell, prime movers which may be operated singly, or, when necessary, in tandem. Since one of these prime movers is mounted on the movable car and is a linear actuator linked directly to the tube bundle, the familiar dogs may be used to hold the car in place during movements of the tube bundle relative to its shell, or the prime movers operating between and linking the base frame to the car may be used as a securing means to lock the car in a preselected, fixed location on the rails. In another mode of operation, both the prime mover on the car and the base frame-to-car prime mover may be operated together to push or pull on the tube bundle. In a third mode, the frame-to-car prime mover may remain inoperative, simply following movements of the car-to-tube bundle prime mover. Finally, the prime mover between car and tube bundle may act as nothing more than a connector, all of the thrust or pulling force being supplied by the other prime mover.

Another object is to provide such a tube bundle extractor in which the prime mover is one or more linear hydraulic actuators having their cylinders secured to the framework of the extractor and so disposed that the pistons are extensible along lines of action parallel to the rails.

A further object is to provide such a tube bundle extractor in which the linear hydraulic actuators provide a mechanical advantage in the pushing or pulling of a tube bundle, i.e., in which the tube bundle is pushed or pulled through a greater length of travel than the distance traveled by the pistons of the hydraulic actuators.

SHORT DESCRIPTION OF THE INVENTION

The present invention lies in part in the concept of utilizing hydraulic cylinders to push or pull a movable car which is attached to a tube bundle which is to be pulled from or pushed into the shell of a heat exchanger. The car itself is of simple design, consisting primarily of a simple metal structure having legs which support rollers engaging the rails of the framework and an uppermost member which supports a linear hydraulic actuator disposed so that its piston rod extends parallel to the rails in the direction for connecting the car to the end sheet of a tube bundle. The hydraulic cylinders (which are also linear actuators) are preferably disposed on and at the sides of the framework, and for balancing purposes an even travel are preferably always paired, so that for every cylinder on the righthand side of the framework there is a corresponding cyliner on the lefthand side, the two acting in unison during whatever operation is being performed.

While it is within the scope of the invention to employ only one such cylinder and piston on each side of the framework, so that the free ends of the pistons may be secured more or less directly to the sides of the car and the car moves one unit of length for each unit of length traveled by the pistons, in the preferred forms of the invention illustrated in the drawing the hydraulic cylinders are located midway between the ends of the framework and are either double-acting or a pair of single-acting cylinders are used. In all instances the cylinders are disposed so that the pistons extend parallel to the rails, and thus parallel to the direction in which the tube bundle is to be pulled or pushed. When single-acting cylinders are used, they are disposed so that the piston of one cylinder extends toward the heat exchanger while the second cylinder (on the same side of the framework) is disposed so that its piston extends away from the heat exchanger. A traveling block is secured to the free end of each piston, and in the simplest form of the invention a cable which passes through the sheave has one end secured to the hydraulic cylinder or adjacent framework. It will be apparent that, even with this simple form, for every foot of travel of the piston the car and tube bundle will be moved two feet along the rails of the extractor.

In a modified form of the invention, a fixed block is mounted at each end of the framework (and prefrably one on each of the lefthand and righthand sides). Each fixed block will have a number of sheaves equal to the number of sheaves in the traveling block mounted on the piston, and the cable is threaded from the movable car first through a sheave of the fixed block, then through a sheave of the traveling block, etc., until the cable is finally secured to a non-moving part of the fixed block. It will be appreciated that, with only one sheave in each of the two bloks, the car will be moved 2 feet for each foot of travel of the piston. When the number of sheaves in each block is increased to two, the car will be moved 4 feet for each foot of travel of the piston, etc.

It will be apparent that there are various alternate modes of operation for the structure thus briefly described. When the tube bundle is especially heavy or is very tightly corroded to the heat exchanger shell, the on-car actuator can be motivated at the same time that the base frame actuators are activated, the two sets of actuators thus combining their pulling (or pushing) capacities to meet the unusually heavy demand. When the load is somewhat lighter, the operator has a choice between using only the base frame actuators, disconnecting the on-car actuator or reducing it to the status of a following device by venting both ends of its hydraulic cylinder, the alternate technique being to use only the on-car actuator to push or pull the tube bundle. This last mode of operation actually has two sub-modes, in one of which the base frame actuators are made completely passive and a set of dogs depending beneath the car alternately engage and disengage cross members of the base frame to enable the car to operate in stepwise fashion, first remaining engaged and pulling the tube the length of its piston travel, then being disengaged and itself moving the same length by virtue of the much greater mass of the tube bundle. In the other sub-mode, the dogs are not used and the base frame actuators are supplied with sufficient hydraulic pressure to lock the car in a preselected location along the length of the rails.

BRIEF DESCRIPTION OF THE DRAWING FIGURES

The invention will be more readily comprehended by referring to the enclosed drawing, in which:

FIG. 2 is a plan view of the apparatus of FIG. 1.

FIG. 3 is a side elevation of the apparatus shown in FIGS. 1 and 2.

Figure 4:
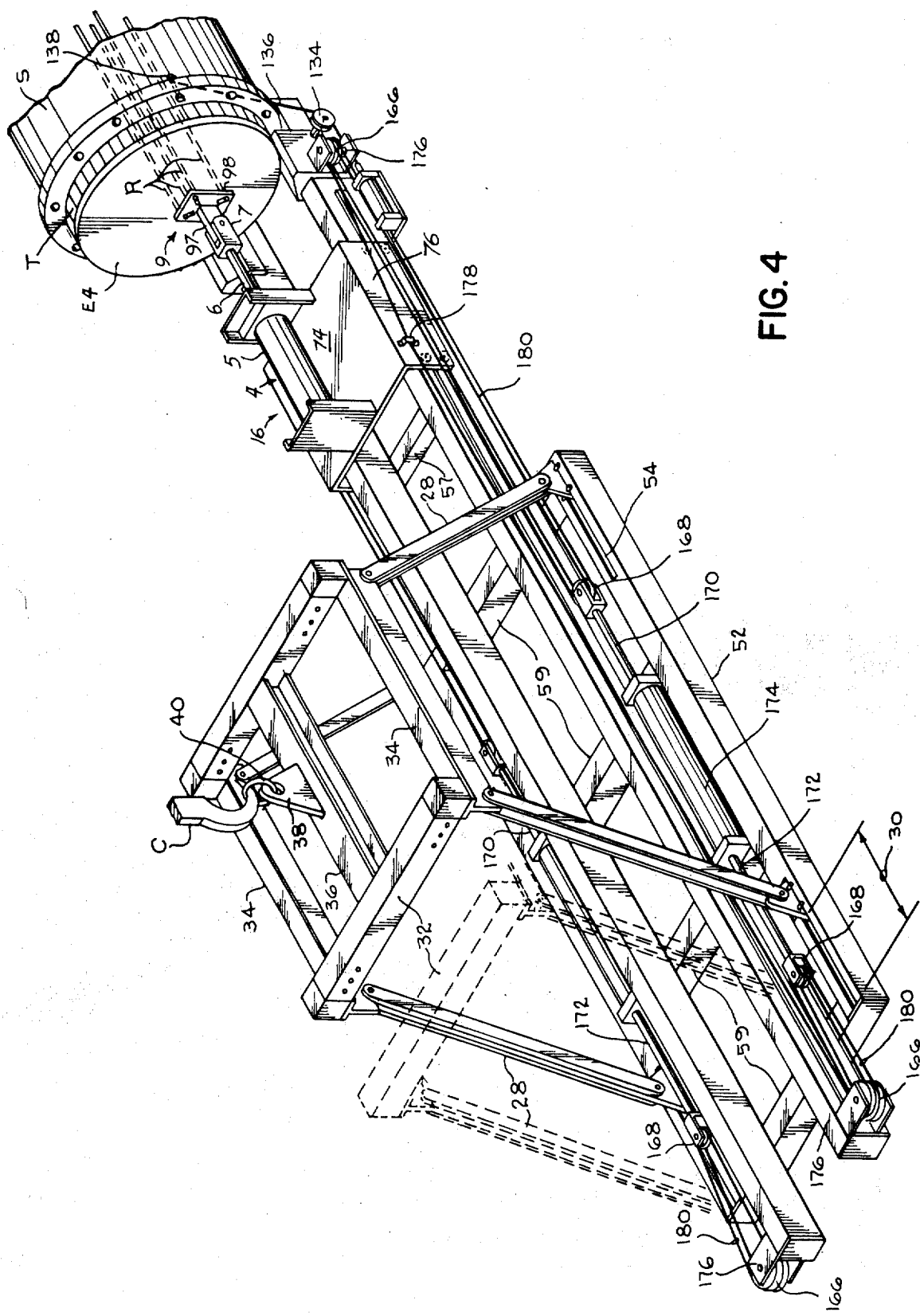

FIG. 4 is a perspective view of another preferred embodiment, this one varying from that shown in the prior figures in utilizing double-acting hydraulic cylinders, and also in including fixed blocks at both ends of the rails and two sheaves in each of the fixed blocks and traveling blocks alike. This figure illustrates the piston rod of the on-car linear actuator connected to a bundle of tubes of the straight-through type, one in which it is possible to run rods all the way through the tubes and secure the rods at both ends for pulling or pushing purposes.

Figure 5:
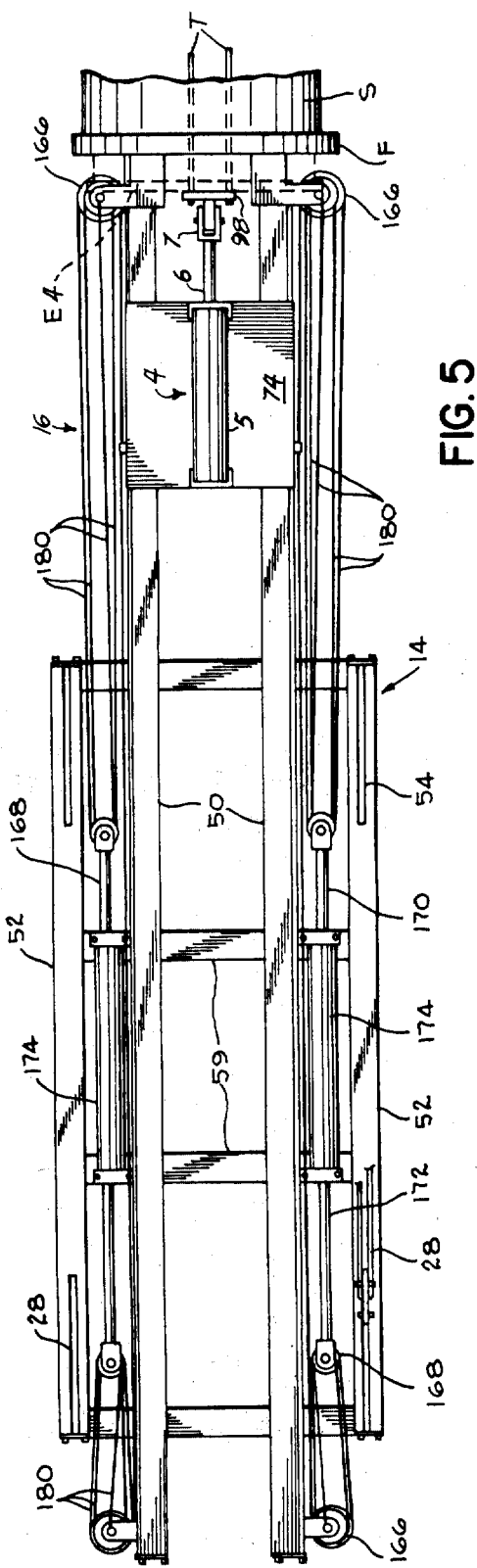

FIG. 5 is a plan view of the structure of FIG. 4.

Figure 6:
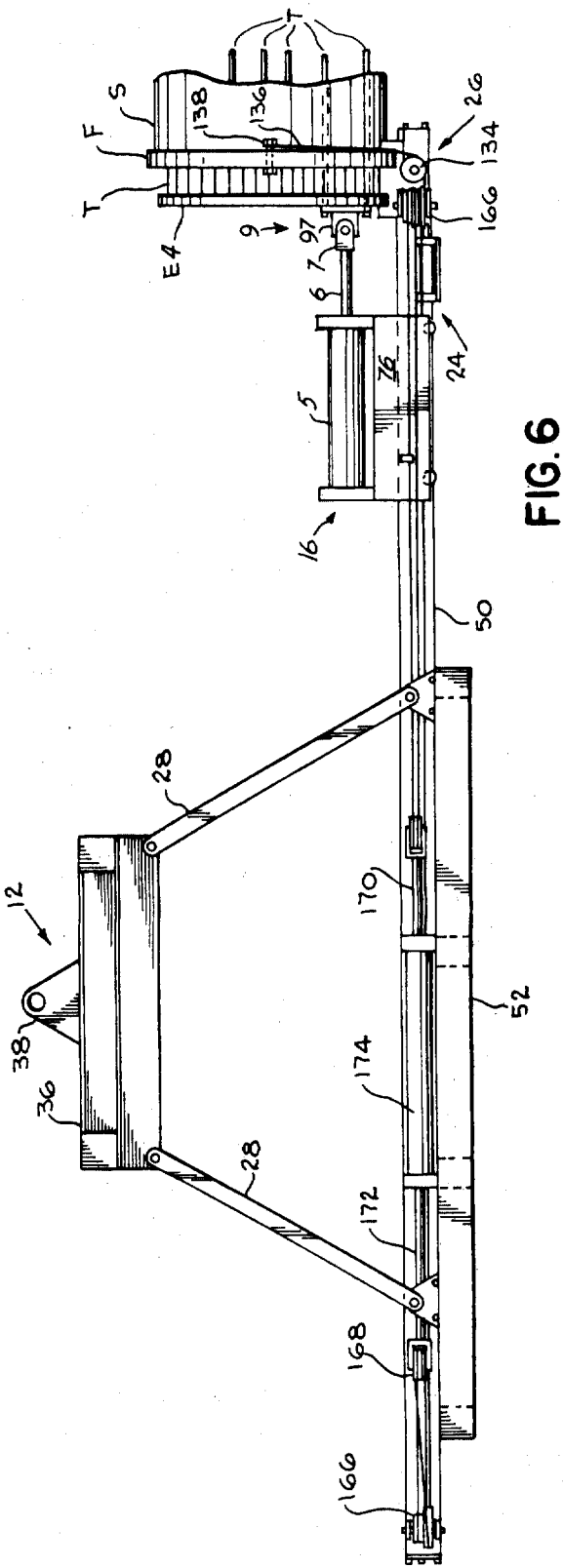

FIG. 6 is a side elevation of the structure shown in FIGS. 4 and 5.

Figure 7:
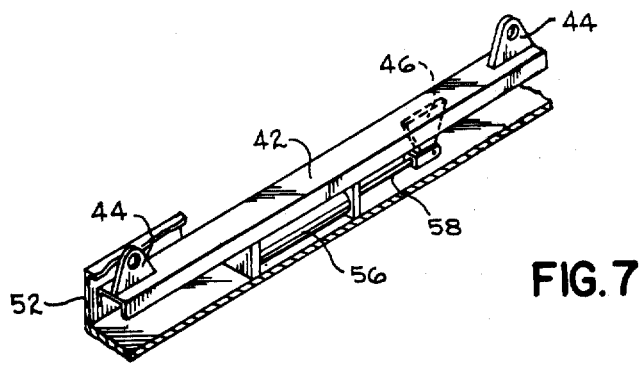

FIG. 7 is a perspective view of portions of the framework showing how one portion may be shifted with respect to the other to adjust the center of gravity of the overall assembly, including any load carried on the rails.

Figure 8:
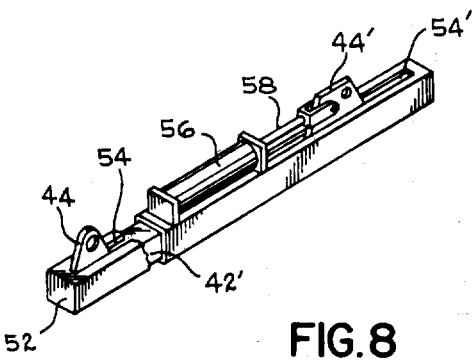

FIG. 8 is a slightly modified form of the adjustable framework shown in FIG. 7.

Figure 9:
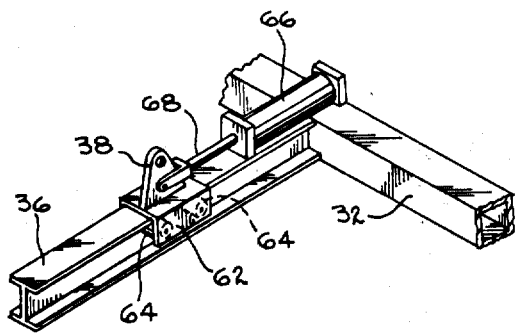

FIG. 9 illustrates another means for shifting one part of the framework relative to another to adjust the center of gravity.

Figure 10:
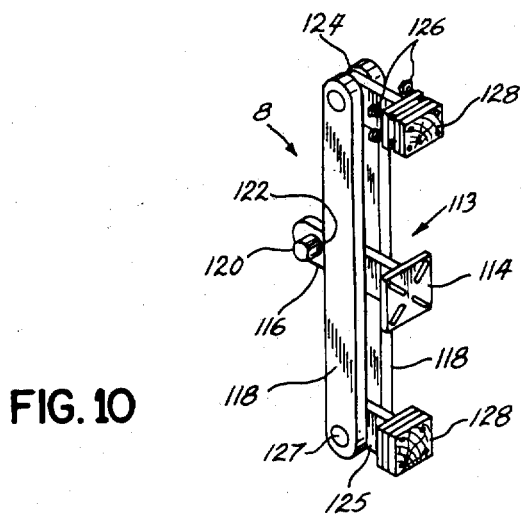

FIG. 10 is a perspective enlarged view of the U-tube connector also shown in FIG. 9.

Figure 11:
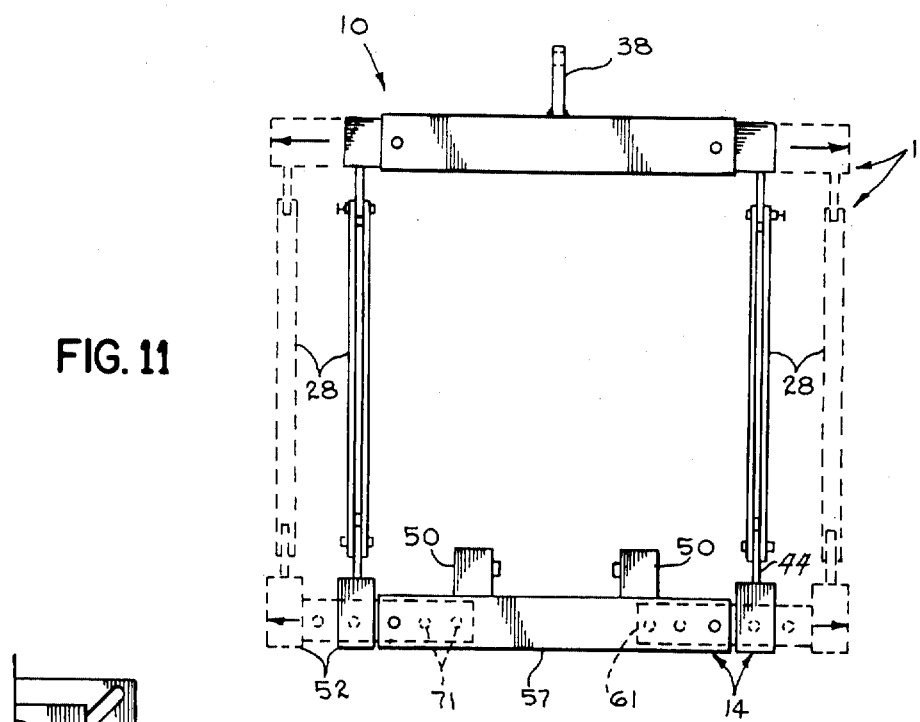

FIG. 11 is a cross-section of the overall framework illustrating how the width thereof may be varied to accommodate tube bundles of various diameters.

Figure 12:
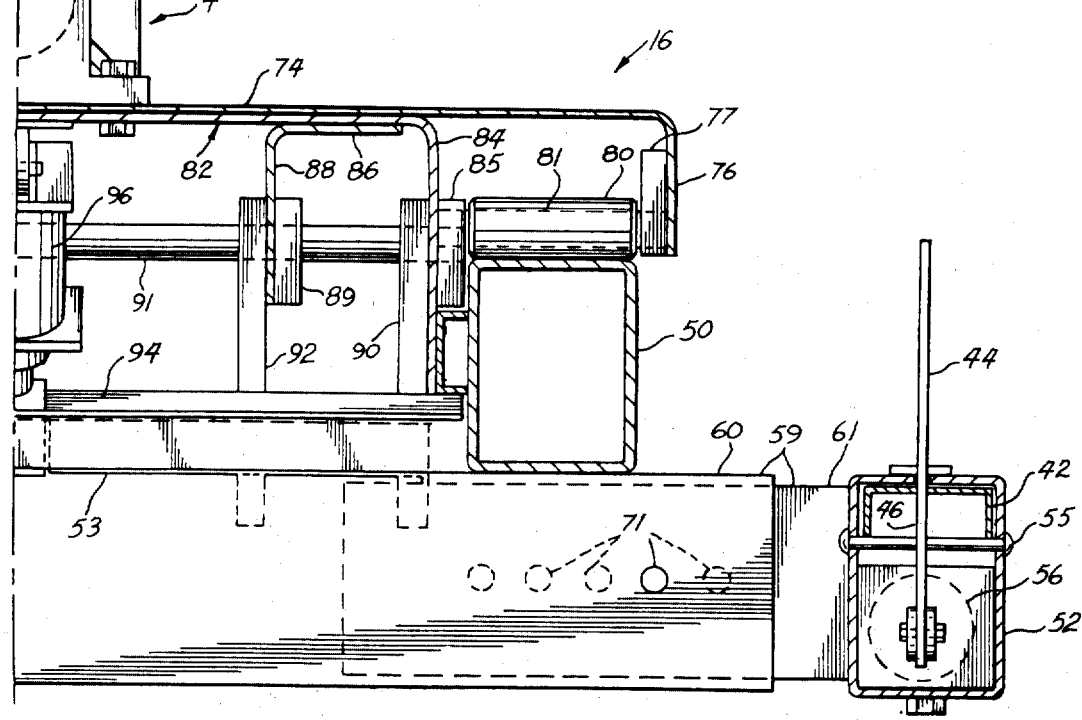

FIG. 12 is an enlarged fragmentary cross-section showing several details of the structure.

Figure 13:
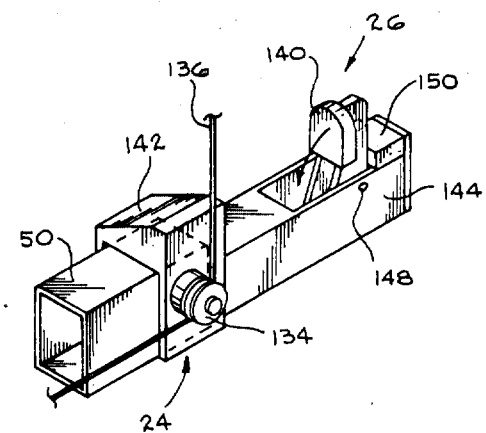

FIG. 13 is a partial perspective view of the forward part of one of the rails of the framework, showing the pivoted jaw of the shell clamp and part of the alignment mechanism of the invention.

Figure 14:
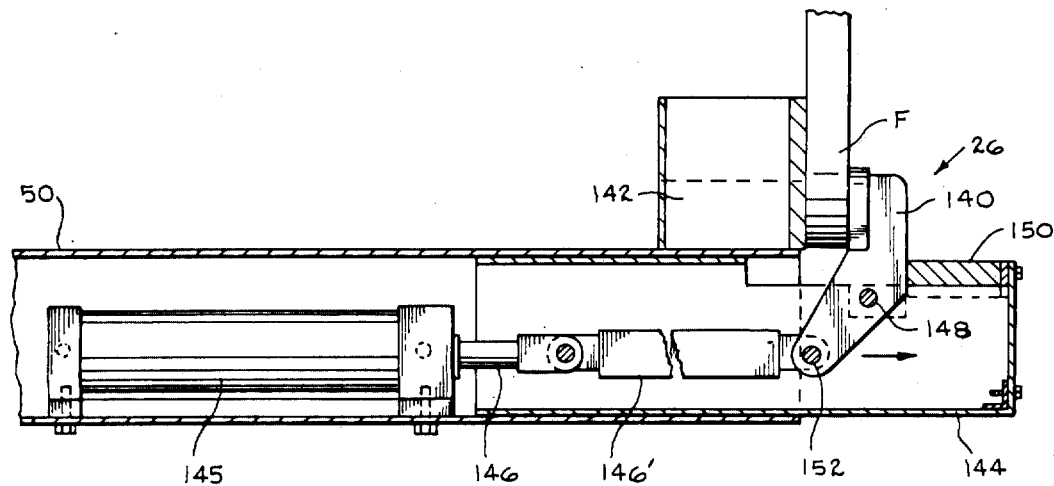

FIG. 14 is a partial longitudinal section of the forward part of one of the rails, showing the same shell clamp as in FIG. 13, together with the actuating hydraulic cylinder and interconnecting piston.

Figure 15:
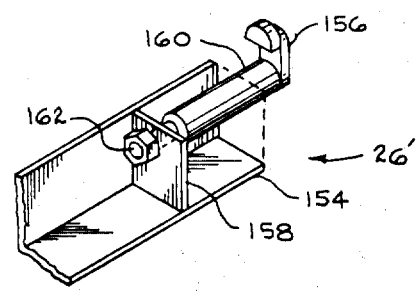

FIG. 15 is a perspective view of an alternate form of shell clamp, this view showing the telescopic, slidable frame member and the rotatable jaw of the modified shell clamp.

Figure 16:
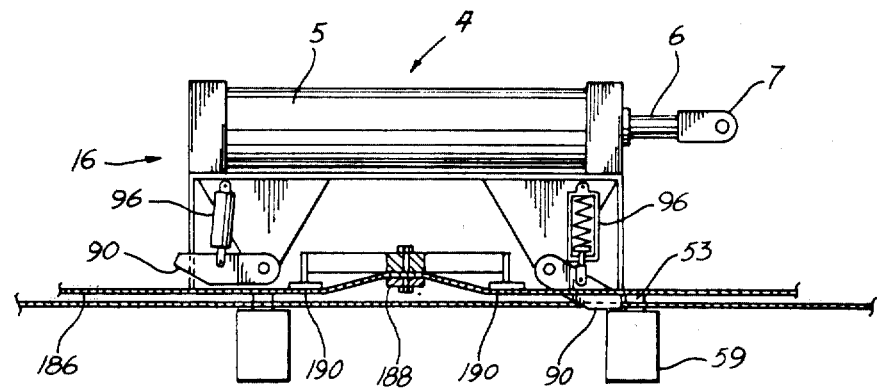

FIG. 16 is a partial longitudinal section showing parts of an auxiliary chain drive.

Figure 17:
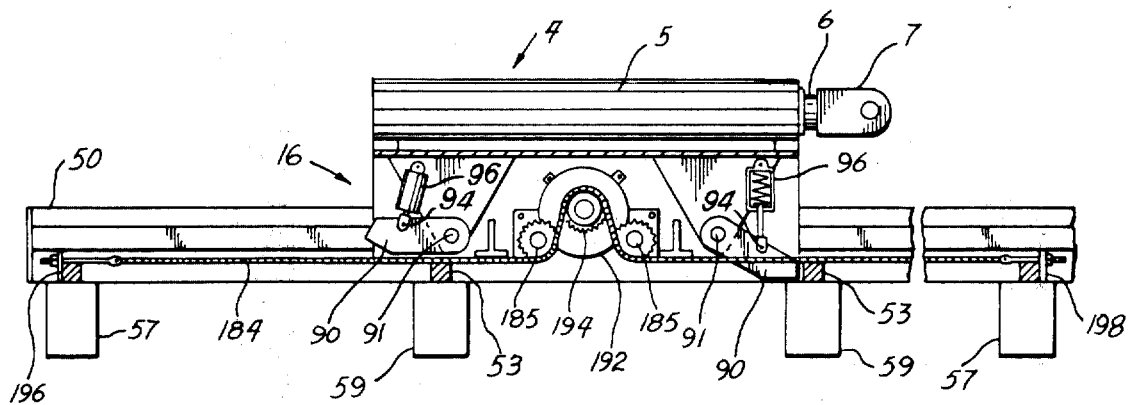

FIG. 17 is an elevation showing a modified form of auxiliary chain drive, one in which the driving motor is mounted on the movable car. This view also shows the dog means which cooperates with fixed transverse blocks on the base frame to hold the car in position during a power stroke.

DETAILED DESCRIPTION OF THE DRAWING FIGURES

Figure 1:
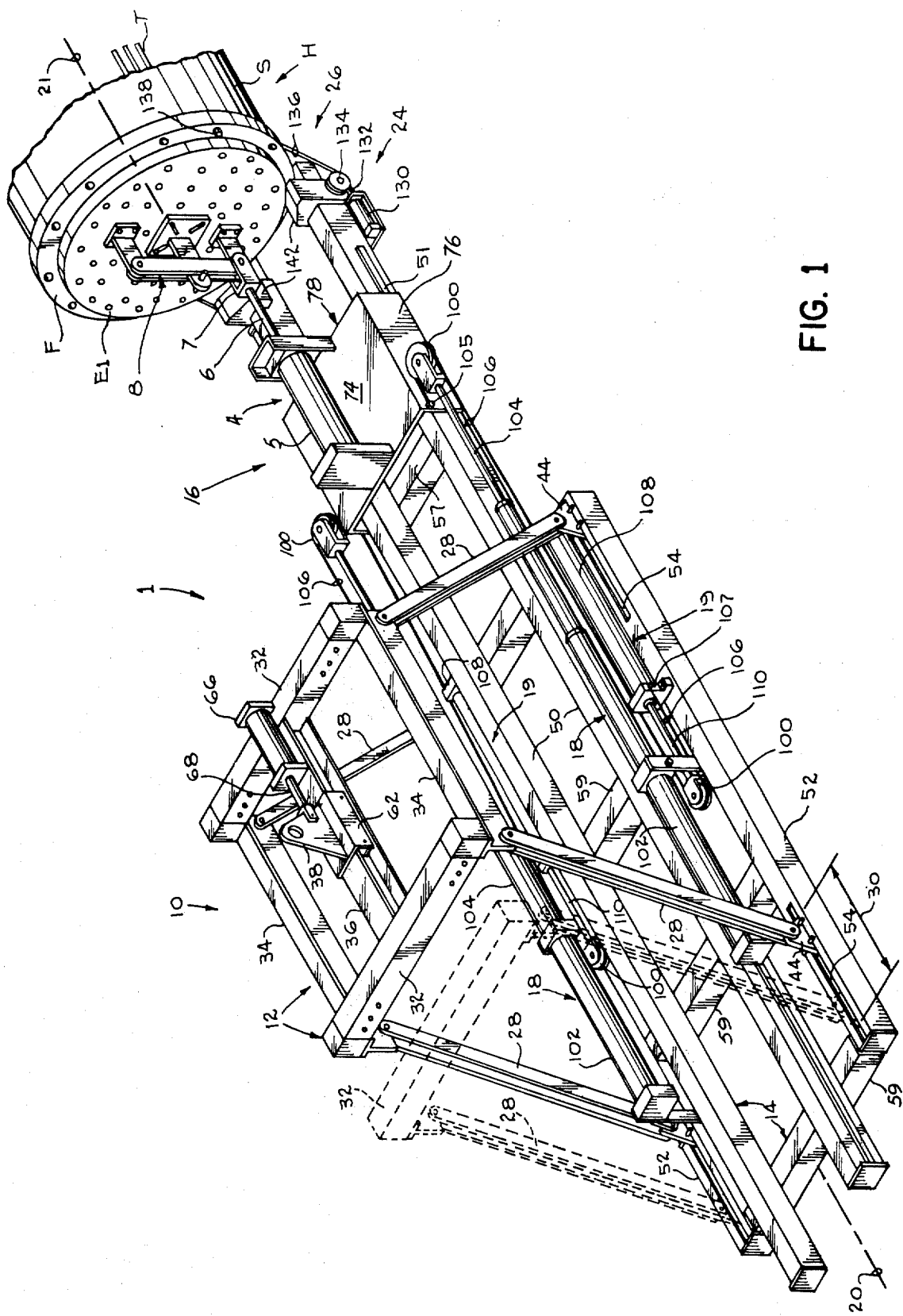
FIG. 1 is a perspective view of a preferred embodiment of the present invention, one using no fixed blocks and a single sheave on the end of each piston rod of the linear hydraulic actuators used as base frame prime movers, this view showing the car mounted prime mover disposed in position for the initial pulling of a bundle of U-tubes from its associated heat exchanger shell.

In FIGS. 1, 2 and 3, the numeral 1 has been used to designate the tube bundle extractor as a whole. Shown also are the elements on which the extractor 1 operates, specifically the heat exchanger H and its shell S, the end flange F of the heat exchanger shell, tube bundle T shown partially protruding rearwardly of shell S and the end sheet E1 of the tube bundle, to which all of the tubes T are attached. It should be understood that the heat exchanger itself is secured to fixed framework inside a chemical plant or oil refinery by means having nothing to do with the present invention. Such securing means hold the shell of the heat exchanger in place against all types of movements, but do not prevent the tube bundle T from being pulled out of the heat exchanger.

The principal parts of the tube bundle extractor 1 are the framework 10, itself divided into a suspension framework, upper subframe or cradle 12 and a base framework 14, movable car or carriage 16, the on-car linear actuator or prime mover 4, the prime movers 18 and 19 secured to the sides of the rails, the connector 8 which ties the prime mover 4 of car 16 to the tube bundle T, the alignment mechanism 24 which adjustably connects the forward end of base frame 14 to the shell S, and the clamping mechanism 26 which clamps the base frame 14 to shell flange F.

The reason for distinguishing between parts of framework 10 is because the cradle or upper subframe portion 12 is longitudinally movable with respect to base frame 14. This is made apparent in FIG. 1 by the two positions shown for the vertical or tension bars 28 and the cross bars 32; the solid outlines of these members indicate one extreme position while the dashed or phantom outlines indicate the other extreme position of these members. The distance traveled by the cradle between its two extreme positions is also indicated by the dimension labelled "30." The cradle framework includes a superstructure consisting of the pair of cross bars 32 and a pair of lengthwise bars 34, solidly secured together at their corners to form a rigid rectangle, and the center brace 36 in the form of an I-beam to which is secured a crane ear 38. The balance of cradle 12 is made up of the four tension bars 28 secured to and extending downwardly from the corners of the superstructure rectangle, and a pair of beams 42 (see FIG. 7) secured to the lower ends of the pair of tension bars 28, on either side of center line 20, through ears 44.

As particularly brought out in FIG. 7, the slide beams 42 are elongated and disposed in a direction parallel to the longitudinal axis or center line 20 of the tube bundle extractor, and are disposed within the pair of hollow rectangular outrigger beams 52 of base framework 14, outrigger beams 52 likewise extending parallel to longitudinal axis 20 between the lower ends of tension bars 28. At its opposed upper corners, each beam 52 is provided with a longitudinally extending slot 54 (see FIG. 1) and on opposed ends each sliding beam 42 has secured an upwardly projecting ear 44 which extends through a slot 54 and is connected by appropriate pinning to the lower end of a tension bar 28.

To provide for relative movement, a linear actuator in the form of a hydraulic cylinder 56 is fixed to the outrigger beam 52 with its extensible piston rod 58 projecting longitudinally parallel to axis 20. At its free end piston rod 58 is connected to an ear 46 rigidly secured to sliding beam 42. Thus, when the tube bundle extractor 1 is hanging free from a crane hook passing through the opening of ear 38, actuation of hydraulic cylinder 56 to move piston rod 58 causes beams 42 to slide within outrigger beam 52, moving the four tension bars 28 and the entire upper framework or superstructure 12 including the crane ear 38 in the same direction. Since the crane ear and the hook itself may be static at such moment, the actual movement relative to the ground is a movement of the base frame 14, together with any load it may then be supporting. By thus shifting the load supported by the cradle, the center of gravity of the entire suspended assembly, both tube bundle extractor and any tube bundle it is then supporting, may be shifted to lie directly below the crane hook, averting any possibility of tipping the assembly and permitting the load to slide along the rails of the base frame. Similar adjustments may be made when the base frame is tightly connected to a heat exchanger, as by first moving the crane hook chain to a new location and then actuating cylinder 56 to cause movement of the cradle and hook to a position directly below the chain.

A slightly modified form of the frame balancing structure is shown in FIG. 8. Here the hydraulic cylinder 56 is disposed on and secured to the top surface of outrigger beam 52, and one of the ears of sliding beam 42 is elongated at 44' to provide means for securing the sliding beam to the piston rod 58 of the linear actuator. The only modification required in the outrigger beam 52 is to somewhat lengthen the slot 54' which accommodates the ear 44'. The alternate construction is somewhat simpler to manufacture, and makes cylinder 56 more readily available for servicing.

A more completely different embodiment of the frame balancing structure is shown in FIG. 9. In this embodiment the ear 38 which is used as the point of suspension from a crane hook is welded or otherwise firmly secured to a member 62 which is slidable along the top flange of the I-beam brace 36 of the framework superstructure. The sliding member 62 is shaped generally like a hollow rectangle having its bottom wall slotted to receive the vertical web of the I-beam 36. This same bottom member is bent up, on both sides of the slot adjacent to the web of the I-beam, to povide an inner support or journal for the rollers 64 which are also journalled to the outer legs of the rectangle. Such rollers 64 serve the usual purpose of reducing the frictional force between the sliding member 62 and the I-beam 36. Sliding of the member 62 and ear 38 is accomplished through a hydraulic cylinder 66 fixed to the frame members 32 and 36 and a piston rod 68 extending out of the cylinder and actuated by it.

As seen particularly in FIGS. 1,2,3,11, and 12, the base frame 14 includes the pair of outrigger beams 52, a plurality of cross beams 59 extending between and secured to the outrigger beams, a pair of parallel rails 50 which are elongated parallel to the axis 20 and project beyond outrigger rails 52 at both ends, and a number of shorter crossbeams 57 tying the projecting portions of rails 50 to each other. The rails 50 rest on crossbeams 59 and 57 and are rigidly secured to them, as by welding. As indicated in FIG. 12, each crossbeam 59 consists of two parts which are telescopic with respect to one another. The larger crossbeam 60 is a hollow rectangular member receiving a slightly smaller rectangular member 61 in sliding relationship. A series of aligned, pin-receiving holes 71 in the two members permit stepwise movement of telescopic sections 61 and thus of the outrigger beams 52 to adjust the width between the outrigger beams. A similar telescoping structure is provided for the crossbeams 32 of the upper subframe 12. Since the tension members 28 extend directly up from the outrigger beams and these members 28 determine the width of tube bundle that can be accommodated on the tube bundle extractor, it will be apparent that the flexibility affored by the telescopic arrangement of the crossbeams makes it possible to accommodate tube bundles of various diameters without any radical reorganization of the supporting structure.

The construction and operation of the movable car 16 are seen to best advantage in FIGS. 1,2,3 and 12, with modifications shown in FIGS. 6 and 8. From these figures it will be seen that the framework of the car consists of a top plate bent over at the sides to form side plates 76, a pair of end plates 78, an interior U-shaped plate 82 secured to the under side of top plate 74 and having the pair of bent over and depending side plates 84 and an L-shaped plate 86 secured to a portion of the U-plate 82 and having a depending vertical arm 88. The car is supported on the main rails 50 through the medium of four rollers 80 rotatably supported on idler shafts 81 jounaled in journal blocks 77 and 85, block 77 being secured to the inner surface of side member 76 and block 85 being secured to the vertical plate member 84. Also journaled in block 85 is the long idler shaft or pivot pin 91, which extends through vertical plates 84 and 88 at either side of the car, and is also supported in journal blocks 89. Pivotally mounted on pin 91 are the depending dogs 90 and 92 which, as shown FIG. 17, have their free ends squared off to be received in the angle formed by the upper surfaces of crossbeams 57 and 59 and the transverse block 53 secured to the same upper surfaces.

The dog members are raised and lowerer by spring-biased air cylinders 96, one at each end of the car 16, each being pivotally mounted to the under side of plate 82 and pivotally linked to one of the transverse links 94 which also extends through the dogs 90 and 92. Each air cylinder 96 is open at the top, air being admitted between the closed lower end of the cylinder and the sliding head of the piston within the cylinder bore. The bias is to the downward position as shown for the right hand dog 90 in FIG. 17, i.e., this is the position the dog is forced into by the action of the spring when there is no air pressure within the cylinder 96. The two cylinders are hydraulically interlinked at the control valve (not shown) so that when air is supplied to one cylinder to raise the dog clear of block 53, the air is bled from the cylinder at the opposed end to cause the spring of the cylinder to push the dog into its lower, engaged position. The safety features require that one or both dogs be lowered at all times, thus preventing the car from experiencing an uncontrolled movement greater than the distance between a pair of blocks 53.

The prime mover 4 is a linear actuator disposed parallel to the longitudinal axis 20 of the framework and axis 21 of the heat exchanger shell S. Its cylinder portion 5 is rigidly secured in the top plate 74 of car 16, with its piston rod 6 extendable in the longitudinal direction toward or away from tube bundle T. Mounted on the free end of piston rod 6 is a clevis 7 for connection to the connector of assembly 8 of FIG. 1 or the assembly 9 of FIG. 4. In either event horizontally aligned transverse openings through the arms of clevis 7 receive a pin also extending through an element of the connector means, which in the case of the FIG. 4 connector is an ear 97 rigidly secured to connector plate 98 and extending away from the tube sheet E4. It will also be noted that the linear actuator 4 is disposed well below the center line of the tube bundle T; this has been done deliberately because the center of gravity of the tube bundle does not lie on its geometric center line, as might be supposed. Because of the products of corrosion that accumulate within a heat exchanger, the center of gravity is actually well below the center of the tubes themselves.

The tube bundle connector 8 of the present invention is shown in FIGS. 1,2,3 and 10, the latter being an enlarged isometric view of the connector apart from its setting. These figures show a connector 8 especially adapted for use with bundles of U-tubes, those in which a pair of tubes are open at the forward end, as seen in the figures, but are paired together by a connector neck at the rear, making it impossible to push a tie rod all the way through any one tube, as in the FIG. 4 embodiment. When U-tubes are employed in the heat exchanger, the forward end sheet E1 is provided with a number of tapped and threaded holes clustered about the geometric center of the end sheet, and the connector must be tied to the end sheet through these holes. In the connector 8 this is accomplished by screwing into such holes a structural element herein dubbed "T member"113, consisting of a transverse plate 114 integrally secured at its center to a longitudinally extending leg 116 which meets plate 114 at right angles and bisects it at its center line. The leg 116 extends between a pair of parallel vertical or tie rods 118, and has a projection rearwardly of the same provided with a transverse opening receiving a pin 120 having theron a flat surface 122 designed to press against the rear edges of link bars 118. At their upper and lower extremities, the pair of link rods 118 are pivotally connected to two additional T-members 124 and 125, each of which is connected by four jackscrews 126 to a spacer block 128 preferably made of a hard, dense wood such as rosewood. The pivot pin used to connect the lower T-member 125 to the link bars 118 is also used to connect the clevis 7 to the connector 8, as indicated in FIG. 1.

In assembling connector 8, the T-member 113 is first connected to the end sheet E1 of the tube bundle, and the pair of link bars 118 are connected to the clevis 7, with lowermost T-member 125 in place. The bars 118 are swung to the illustrated vertical position, spanning leg 116 of T-member 113. The upper T-member is then assembled to the link bars 118, after which pin 120 is inserted in the opening leg 116 of center T-member 112 with its flat 122 facing toward the rear edges of link bars 118. Both sets of jackscrews 126 are then adjusted so that both of the spacer blocks 128 press against end sheet E1 of the tube bundle. As the jackscrews are tightened, they push link bars 118 away from the tube sheet and cause them to press tightly against pin 120 until the pin is tightly jammed between the link bars and leg 116. With this arrangement, a pulling force exerted through the power piston and its clevis 7 in the direction away from the end sheet is transmitted to the tube bundle through lowermost pivot pin 127, link bars 118, pin 120, leg 116 and its attached plate 114 to the end sheet. It should be noted that in so doing the pulling force must pass through the flat surface 122 of the pin and then through the curved surface of the pin to the similarily curved surface of the opening in leg 116 which accommodates it. In this manner the pulling force is first concentrated in a very small central area and then destributed equally to the four or more screws holding plate 114 to the end sheet.

Each of the prime movers 18 and 19 of the FIGS. 1–3 embodiment is a linear hydraulic actuator, and each is secured to the framework 14 so that its telescopic piston 104 is extendable along a line of action parallel to the centerline 20 of the actuator and centerline 21 of the heat exchanger. Prime movers 18 (one on the outside of each rail 50) have their hydraulic cylinders 102 disposed so that piston rods 104 extend toward the heat exchanger H, and they are thus the operative pair when pushing the car 16 and any attached tube bundle toward the heat exchanger. On the other hand, prime movers 19 have their hydraulic cylinders 108 disposed so that the pistons extend away from the heat exchanger, to the outboard end of the framework 10, and thus serve as pull cylinders. Each of the pistons 104 and 110 has mounted on its free ends, to rotate about a vertical axis, an idler sheave 100, and through this sheave is threaded a cable 106. Each cable 106 has one end secured to the anchor point 105 to the side 76 of car 16, while the other end is secured to the side of the hydraulic cylinder from which the involved piston extends, as indicated in the drawing by fixed anchor point 107. It is not essential that the fixed end of the cable be secured to the cylinder, as it may also be secured to some adjacent part of the framework; all that is necessary is that the anchor point be one that will permit a full retraction and full extension of the piston.

When the on-car prime mover 4 is rendered passive, it will be apparent from FIGS. 1,2, and 3 that prime movers 18 will be doing all of the work when a tube bundle is being pushed into the heat exchanger; during this time the pull prime movers 19 are actuated to simply follow the action, their pistons 110 being retracted at the same rate that the pistons 104 of the push cylinders are being extended. The converse, of course, is the case when a tube bundle is being pulled out of the heat exchanger and toward the outboard end of the extractor framework. It will also be apparent that the car and attached tube bundle will travel two units of length for each unit of length traveled by any one of the piston, and it is because of this that the cylinders are preferably located at about the midpoint of the framework, approximately midway between the two ends.

The prime mover shown in FIGS. 4,5 and 6, differs from that shown in the prior figures principally in the addition of a pair of fixed blocks 166 at each end of the extractor framework. As illustrated, each of these fixed blocks 166 contains two idler sheaves disposed to rotate about a vertical pin, and each traveling block 168 disposed on the end of push pistons 170 and pull pistons 172 also includes two horizontally mounted sheaves. In the FIG. 4 embodiment, one double-acting hydrualic cylinder 174 is used with both a pull piston 172 and a push piston 170, and of course a double-acting actuator such as this could have been used with the earlier described embodiment. It should also be noted that each of the fixed blocks and each of the traveling blocks could be equipped with only one sheave, and this assembly would give the same results as that in the first described embodiment.

The advantage of using two sheaves rather than one, of course, is in the greater speed with which the car and any attached tube bundle may be moved relative to the pistons. In the FIG. 4 embodiment, the car and tube bundle will be moved four units of length for each unit of length traveled by the pistons. It should also be noted that each of the fixed anchor points 176 for cable 180 is on the fixed block 166, while of course the traveling anchor point for each cable is on the car 16' itself. It should be further noted that with the FIG. 4 assembly it is possible to use a single cable, as indicated in the drawing, where the single anchor point 178 is indicated (whereas in the FIG. 1 embodiment two such anchor points on the car are needed). This is because the use of a single cable is fully equivalent to using two cables separated at point 178 and with both of the separated ends firmly secured to the car.

The general scheme for obtaining proper vertical and transverse orientation of the tube bundle extractor 1 with respect to the heat exchanger H is first to adjust the position of the extractor by means of the crane until rails 50 are approximately tangent to flange F of the heat exchanger shell, then fix the vertical location of the forward ends of the rails in contact with flange F, by means of the alignment mechanism 24, and finally adjust the vertical position of crane hook C (FIG. 4) until the axis 20 of the tube bundle extractor is parallel to the axis 21 of the heat exchanger. At the same time that this is being done, of course, the longitudinal position of the extractor is determined by causing the forward annular surfaces of the pair of blocks 142 which are fixed on the forward ends of rails 50 and serve as the fixed jaws of the shell clamps 26.

The vertical alignment and securing mechanism 24 is probably shown to best advantage in FIGS. 2 and 3. It consists primarily of a hydraulic cylinder 130 secured on the outside wall of rail 50 adjacent its forward end, the cylinder and its extensible piston rod 132 being disposed longitudinally so that the piston may be extended toward end sheet E1 or retracted from it. The other components are the sheave 134 mounted on the outer wall of block 142 on a horizontally disposed idler shaft, the cable 136 having one end secured to the free end of the piston, bent around sheave 134 and extending upwardly to join a connecting bolt 138 through one of the bolt openings in flange F of the shell. The cable is shown attached to the portion of the connector 138 protruding from the back face of the flange F simply because there is more room available in the back than on the front side of the flange. It will be apparent that retraction of the piston 132 from the position shown in FIGS. 1,2 and 3 will cause the cable to tighten, tending to lift the forward end of the framework upwardly with respect to the heat exchanger. Since there is an alignment mechanism 24 on each of the rails 50, adjustment of both of them can be used to correct any roll of the extractor framework, i.e., the alignment mechanism may be used to insure that the rails 50 lie in a common horizontal plane. What is not so apparent is that these mechanisms may also be used to rotate the tube bundle within its shell, alternately pulling down on one side and then on the other when the tube bundle has become so tightly corroded to its shell that some twisting is in order in an attempt to loosen the tube bundle for more ready extraction.

The shell clamping mechanism 26 serves two functions, one being to orient the tube bundle extractor in longitudinal relationship to the heat exchanger and the other to serve as a means for transmitting the unavoidably produced thrust; there must be something tied to the earth to push against before the pulling mechanism of the extractor can effectively pull the tube bundle out of its shell. A remotely controlled form of shell clamp is pictured in FIGS. 1–6,13 and 14, the last two figures showing particular details. As illustrated, the clamp includes fixed jaw 142 rigidly secured to rail 50, movable jaw 140, a telescopic inner beam 144 slidable within rail 50, a hydraulic cylinder 145 disposed inside of rail 50 and secured thereto with a longitudinal disposition, and the piston rod 146 and piston extension 146' extensible from and retractable into cylinder 145. The movable jaw 140 is pivotally mounted on an idler pin 148 journaled to the side walls of extensible rail 144 and has an angular portion pivotally attached to the end of piston 146 at the pinned connection 152. A stop block 150 is secured to the top of the otherwise open telescopic member 144 to prevent further clockwise rotation of pivoted jaw 140 than indicated in FIGS. 13 and 14.

Operation of the clamp 26 can best be understood by looking at FIGS. 13 and 14 together, and then starting from the position shown in FIG. 13, where the movable jaw 140 is spaced from fixed jaw 142 a considerably greater distance than the thickness of a shell flange F. Since the movable jaw 140 as shown in FIG. 16 is already in its upright, operative position, it will be apparent that retraction of piston rod 146 into its cylinder 144 will merely pull the slidable telescopic member 144 within rail 50 until jaw 140 meets with resistance, as by contacting the rear surface of flange F as shown in FIG. 11. As long as the retraction pressure is maintained on the piston, the flange F will be tightly gripped between the jaws 142 and 140. On the other hand, if the pressure in the cylinder 144 is reversed to cause the piston rod 146 to be extended further from its cylinder, it will be apparent that two things will happen: first, telescopic section 144 will be moved out of rail 50, in the direction indicated by the arrow in FIG. 14, and secondly, the movable jaw will be rotated about its pivot 148 until it is wholly containd within the hollow enclosure defined by member 144, moving as shown by the rotation arrow of FIG. 13. In this nonoperative position, the tube bundle extractor can be assembled to or disassembled from the heat exchanger without interference from the jaws 140.

An alternate form of shell clamp 26' is illustrated in FIG. 15, one requiring some manual adjustment in tightening or loosening the movable jaw 156. It is similar to the previously described embodiment in that it includes a telescopic member 154 slidable within the rail 50 and actuated by a hydraulic cylinder and piston like those indicated in the FIG. 14 embodiment, but differs therefrom in that in the manual embodiment of FIG. 15 the piston is linked directly to sliding member 154. A bearing plate 158 is welded or otherwise secured within the enclosure defined by beam 154 at a spacing from the end thereof. The movable jaw 156 is rigidly secured to one end of a shaft 160 rotatably mounted in the end plate (shown in phantom) of telescopic beam 154 and extends longitudinally to a reduced diameter shoulder which butts against plate 158. The small diameter portion of shaft 160 extends through an opening in bearing plate 158 and is threaded to receive a nut 162 welded to plate 158 concentric with the opening therethrough. Thus the assembly may be completed by tightening the threaded engagement between shaft 160 and nut 162, then loosening the same during an inoperative period just enough to let shaft 160 rotate until the jaw 156 hangs downwardly, out of the way. When the clamp is to be engaged, it is not essential that the threaded engagement be made up tightly, as the clamping pressure is obtained through the hydraulic cylinder rather than the mechanical interlock of the threads. All that is necessary is to have some of the threads engaged and the jaw in its upright position, as illustrated, when the sliding member 154 is pulled in the direction to cause jaw 156 to contact the back surface of the shell flange.

The remaining drawing figures, FIGS. 16 and 17, illustrate auxiliary, relatively low thrust prime movers. Once a tube bundle is broken loose, the remaining part of the extraction requires a relatively small pull, and this can be accomplished by the auxiliary prime mover illustrated in the drawing figures. One such a auxiliary prime mover is shown in drawing FIG. 16, and consists primarily of chain 186 centered between rails 50 and below the path of car 16 a driving motor located at the rear of base frame 14, and appropriate drive sprockets, idler sprockets and guide sprockets, all of which are conventional and are not shown herein. The chain 186 is preferably secured to the undercarriage of car 16 by a clamp 188 having teeth not shown which enter between links of the chain to prevent all relative movement. This is depicted in FIG. 16, which also show a pair of guide members 190 for the chain. This structure on car 16 is rigidly linked to chain 186, but power need never be applied through the chain drive motor during the periods when it is necessary to use the prime mover 4 on the upper side of car 16.

A somewhat different type of auxiliary prime mover is illustracted in FIG. 17. In this form a pair of rotary motors 192 secured to the nether side of car 16 have a common shaft on which is mounted the necessary sprockets 194 to engage the chain 184. The idler sprockets 185 simply fix the position of the chain, which is secured against rotation by an anchor 196 at the rear end of the base frame and a similar anchor 198 which secures it to the framework at the forward end of the base frame. Thus, the mode of travel when using this form of auxiliary prime mover is to rotate the motor 192 and let the motor pull the car through the chains: the car walks on the chain.

As now visualized by this inventor, his main contribution in the present patent is a large measure of versatility in the choice and combination of the main prime movers, in particularly those used in the first movement of a much used tube bundle from a condition in which it has become tightly corroded to the shell of a heat exchanger. The above description discloses several alternate structures and methods for accomplishing the desired initial movement, which may require a large force for only a centimeter or two of movement, or even as little as a fraction of a centimeter. Mechanical theorists and purists may, with a certain amount of theoretical authority, object that the combination of a car mounted prime mover pulling directly on a tube bundle can not really combine with one or more frame mounted prime movers which pull in the same direction but act on the car. In this they are mistaken, however, as the practical situation is analogous to pulling a man out of a well into which he has fallen a few feet below the surface and has then become tightly wedged. The first rescuer who appears on the scene is able to reach down the well and grab the victim by the hand, but finds himself unable to exert sufficient force to break the victim loose. Second and third rescuers arrive to help, but there is only room in the well for one hero to make direct contact with the hapless victim. The dilemma is solved when the second and third rescuers grasp the legs of the first and pull upward, while the first rescuer is also pulling on the victim. All three together pull the stuck man that very small distance necessary to break him loose from the wall of the hole, whereas neither group acting alone could have done the deed. Just so can the car-mounted prime mover and base frame mounted prime movers of the invention combine to pull a tightly corroded tube bundle that very small distance necessary to break the corrosive bonds to the heat exchanger shell which previously held it prisoner.

What is claimed is:

1. A tube bundle extractor for removing a bundle of tubes from a heat exchanger or inserting the same therein, said tube bundle extractor having a longitudinal dimension and comprising:
    A. an open, three-dimensional framework including an upper subframe adapted to be supported from a crane hook, a base frame disposed below the upper subframe and with a usually horizontal orientation, and a set of tension bars pivotally connecting said upper subframe and said base frame; said tension bars being spaced from one another athwart said longitudinal dimension to accommodate a tube bundle,
    B. a pair of parallel rails secured to said base frame and extending parallel to the longitudinal dimension thereof, said rails protruding beyond at least one end of the base frame,
    C. means on said protruding ends of the rails to secure them to the end of a heat exchanger, in vertical and longitudinal therewith,
    D. a car slidable on said rails along the length thereof and adapted for connection to said tube bundle for pulling the same from the heat exchanger or pushing the same therein, and
    E. prime mover or hydraulic thrust and reaction means operating between said base frame and car to move said tube bundle into or out of said heat exchanger and transmit the reaction or opposing force through said base, such means comprising a first prime mover in the form of a number of oppositely - acting, parallel linear hydraulic actuators each having a cylinder secured to said base frame and a pistion rod extending from the cylinder in a direction parallel to the rails, said linear hydraulic actuators simultaneously acting on said car by sheave and cable means to cause movement of the car.

2. The tube bundle extractor of claim 1 in which said hydraulic thrust and reaction means includes a second prime mover in the form of a linear hydraulic actuator having its cylinder secured to said car and its piston rod extending from the cylinder toward said tube bundle and in a direction parallel to said rails, said piston rod being connected to the tube bundle so that movement of the rod causes movement of the tube bundle, said car being detachably secured to a predetermined location on the rails during movement of the tube bundle.

3. A method of pulling a tube bundle from a typically horizontally mounted heat exchanger comprising the steps of
    a. suspending from a crane hook in the front of said heat exchanger a tube bundle extractor of the type set forth in claim 2 above,
    b. detachably securing and clamping said extractor to the shell of said heat extractor, in longitudinal and vertical alignment therewith,
    c. disposing the car of said extractor in a position adjacent the front of said heat exchanger and connecting the car to the tube bundle thereof, and
    d. exerting a pulling force on said tube bundle through one or both of the prime movers of the extractor.

4. The method of claim 3 in which the on-car prime mover is passive and the pulling force is exerted by the prime movers connected between the base frame and the car.

5. The method of claim 3 in which the active prime mover is that connected between the car and the tube bundle, the first prime mover serving to hold the car at a preselected location on said rails.

6. The method of claim 3 in which the two sets of prime movers are activated in concert to exert an unusually large force on the bundle.

7. A tube bundle extractor comprising a longitudinally elongated framework adapted to be supported off the ground by suspension means in alignment with a horizontally disposed, elevated heat exchanger of the type having a shell surrounding a bundle of tubes secured to at least one end sheet, such framework having a pair of spaced apart parallel rails extending along the length of the frame, a car supported on such rails and movable along the length thereof, power means on said car to pull said tube bundle from the heat exchanger or insert it therein, securing means at one end of the framework for detachably securing the framework to the shell of the heat exchanger in end-to-end relationship, and means for connecting the car to the end sheet of the tube bundle of the heat exchanger, together with a number of oppositely acting, parallel linear hydraulic power units mounted on said framework for moving said car and any tube bundle secured thereto along said rails in at least one direction relative to the shell of the heat exchanger, said linear hydraulic power units each including a hydraulic cylinder secured to the framework and having its piston rod extending parallel to said rails, said linear hydraulic power units operating simultaneously on the car through sheave and cable means to cause motion of said car.

8. In a tube bundle extractor of the type having an elongated framework adopted to be suspended from a crane hook and to be secured at one end to the shell of a heat exchanger containing a bundle of tubes attached to an end sheet, the framework supporting a pair of rails adapted to be horizontally and vertically aligned with the heat exchanger to receive the tube bundle, and a car movable along said rails and parallel thereto, said car being adapted for connection to said end sheet, the improvement comprising a number of oppositely acting, parallel linear hydraulic actuators each having its cylinder secured to the framework and its piston extensible parallel to said rails, said linear hydraulic actuators simultaneously acting on the car through sheave and cable means to cause motion of the car.

9. The improved tube bundle extractor of claim 8 which further includes a fixed block located at the end of the framework towards which said piston advances, said fixed block and said piston each having a number of sheaves interconnected by cable to said car to increase the speed of travel of the car.

* * * * *